(12) United States Patent
Vidoni (10) Patent No.: US 11,680,300 B2
(45) Date of Patent: Jun. 20, 2023

(54) TOOL FOR REALISING A PRESS QUENCHING AND TEMPERING METHOD

(71) Applicant: Liebherr-Aerospace Lindenberg GmbH, Lindenberg (DE)

(72) Inventor: Michele Vidoni, Scheidegg (DE)

(73) Assignee: LIEBHERR-AEROSPACE LINDENBERG GMBH, Lindenberg (DE)

(*) Notice: Subject to any disclaimer, the term of this patent is extended or adjusted under 35 U.S.C. 154(b) by 319 days.

(21) Appl. No.: 15/701,466

(22) Filed: Sep. 12, 2017

(65) Prior Publication Data

US 2018/0073091 A1   Mar. 15, 2018

(30) Foreign Application Priority Data

Sep. 15, 2016   (DE) .................... 10 2016 011 191.7

(51) Int. Cl.
| | |
|---|---|
| *C21D 1/62* | (2006.01) |
| *B23K 26/211* | (2014.01) |
| *B23K 26/342* | (2014.01) |
| *B21J 13/04* | (2006.01) |
| *B21J 13/08* | (2006.01) |
| *C21D 7/13* | (2006.01) |
| *B23K 101/14* | (2006.01) |
| *B23K 103/04* | (2006.01) |
| *B21D 22/02* | (2006.01) |
| *B21K 29/00* | (2006.01) |

(52) U.S. Cl.
CPC ............. *C21D 1/62* (2013.01); *B21J 13/04* (2013.01); *B21J 13/085* (2013.01); *B23K 26/211* (2015.10); *B23K 26/342* (2015.10); *C21D 7/13* (2013.01); *B21D 22/022* (2013.01); *B21K 29/00* (2013.01); *B23K 2101/14* (2018.08); *B23K 2103/05* (2018.08)

(58) Field of Classification Search
CPC ............................. B22F 3/1055; B22F 10/38
See application file for complete search history.

(56) References Cited

U.S. PATENT DOCUMENTS

| | | | | |
|---|---|---|---|---|
| 5,626,693 A | * | 5/1997 | Yao ..................... | C21D 1/673 148/519 |
| 6,354,361 B1 | * | 3/2002 | Sachs .................. | B22C 9/065 164/128 |
| 2012/0030929 A1 | * | 2/2012 | Merklein ............. | B21D 37/16 29/592 |
| 2018/0029132 A1 | * | 2/2018 | Prasannavenkatesan ................ | B22F 5/007 |

FOREIGN PATENT DOCUMENTS

| | | |
|---|---|---|
| DE | 102011114691 A1 | 4/2013 |
| DE | 102015012285 A1 | 4/2016 |

OTHER PUBLICATIONS

Search Report issued in corresponding German Patent Application No. 10 2016 011 191.7 dated May 18, 2017 (10 pages).

* cited by examiner

*Primary Examiner* — Christopher S Kessler
(74) *Attorney, Agent, or Firm* — Kilyk & Bowersox, P.L.L.C.

(57) ABSTRACT

The invention relates to a tool for realising a press quenching and tempering method for a rotational symmetric tool, in particular for a gear wheel, wherein the tool is at least in part manufactured as an additive and wherein, in an additively manufactured area of the tool, is formed at least one pipe for guiding a fluid.

12 Claims, 6 Drawing Sheets

TOOL FOR REALISING A PRESS QUENCHING AND TEMPERING METHOD

The invention relates to a tool for realising a press quenching and tempering method for a rotational symmetric tool, in particular a gear wheel, wherein the tool is at least in part manufactured as an additive and wherein, in an additively manufactured area of the tool, is formed at least one pipe for guiding a fluid.

Tools for realising a press quenching and tempering method are known from the state of the art. Whereas the terms of tempering and press quenching respectively hot stamping can be used as synonyms, they can describe two different applications in industrial practice. The term of tempering respectively press quenching relates to a method for machining solid components, such as for example gear wheels, rings, or shafts following their machining, for example by stock removal. The term of hot stamping respectively press hardening can relate to a method where the metal sheet are deformed in a hot state, where a forming-tool enables controlled cooling of the workpiece depending on respectively in the context of the forming process. Both methods use presses and mountings respectively stamps or general tools in the context of a fluid, in particular with a cooling fluid, for controlling the temperature of the workpiece. This allows for desired mechanical properties and geometric dimensions respectively tolerances to be met respectively to be maintained. In both methods, the quality of the manufactured workpiece depends on the precise temperature control respectively the temperature trend during the method.

It is known to manufacture tools for realising the said methods by machining methods by stock removal and by the use of steel. Following machine machining respectively machining of the tool by stock removal, it is furthermore known that the tool undergoes heat treatment. In a last manufacturing step of the tool, it is furthermore known to grind the latter to the desired dimensions and, if necessary, to coat it accordingly for the purpose of improving its welding behaviour. The manufacture of the corresponding tools respectively stamp is impacted to a very large extent by cost issues pertaining to the machining steps necessary to this end respectively to the machining of the tool by stock removal.

For the distribution of the fluid respectively the heat transfer fluid which can also be a gas, it is necessary to manufacture corresponding channels respectively openings on or in the tool or on or in the piece machined respectively manufactured. Hereinafter, the terms of fluid, heat transfer fluid, cooling fluid, tempering respectively hot stamping fluid or work fluid shall be used as synonyms. The terms channel, distribution channel, distribution pipe, opening, fluid channel, cooling pipe, inlet respectively outlet channel and inflow respectively extract, can furthermore describe the pipe of the invention. The terms tool, mounting, stamp, and tool part can relate to the tool of the claims of the invention. Therefore, the invention relates to components respectively to tool parts manufactured accordingly. The workpiece so called hereinafter can be of equal significance with the piece manufactured by means of the tool of the invention, whereas the terms of treating or machining of the workpiece, the manufacture of the workpiece, the realisation of a machining process or a treating process relate to the realisation of the invention of a press quenching and tempering method.

The distribution channels respectively the pipes are typically formed in such a way that a compromise between the streaming distribution of the fluid and the costs of manufacture of the corresponding pipes is made. Moreover, the dimensions and the geometry of the pipes are limited by the geometrical boundaries respectively properties of the tool respectively the workpiece. As known, the conducts are manufactured from straight segments linked to each other, such as boreholes, which can feature a circular or even an angled and in particular a constant cross-sectional area respectively a cross sectional geometry which can feature an area of several square millimetres. The complexity of the pipe achievable by manufacture methods known in the art is here limited by the manufacture technologies.

In the light of the foregoing, the object of the invention is to provide for an improved tool for realising a press quenching and tempering method the manufacture of which is in particular cheaper and which enables the realisation of better process flows.

This object is achieved according to the invention of a tool for realising a press quenching and tempering method featuring the characteristics of claim 1. Advantageous embodiments are the objects of the dependent claims. According to the foregoing, there is provided for a tool which is manufactured at least in part as an additive, wherein at least one pipe for guiding a fluid is formed in an additively manufactured area of the tool. The tool can also be completely manufactured as an additive, wherein the at least one pipe is formed according to the tool completely manufactured as an additive. The term pipe as used herein describes a channel which extends inside the area manufactured as an additive while fluidly linking at least one inlet orifice to at least one outlet orifice, wherein the orifices can also be formed within the area manufactured as an additive.

Due to the manufacture as an additive of the corresponding area and the pipe extending in this area, manufacture of the tool can be simplified and thus the pipe can be better adjusted to the actual temperature needs of the respective location of the area manufactured as an additive. Where the location in question requires a very important amount of, for example, cooling fluid, the pipe provided therein can be dimensioned to be bigger accordingly. Owing to the additive manufacture respectively production respectively manufacture method, the pipe can furthermore show a constant cross section and/or be of a ramified form such that complex fluid streams can be shown inside the tool. One could also conceive to form the pipe by means of the additive manufacture method without any abrupt changes of the pipe run and/or the pipe cross section, in particular with moderately important changes of direction. This allows for positively impacting the flow behaviour of the fluid inside the pipes.

In a preferred embodiment, one can conceive that the at least one pipe is a clearance and/or a recess. Therefore, the tool can also comprise a combination of clearances and recesses. The recesses can herein be arranged in particular in the area of the tool where the tool, when used, is in contact with a workpiece. The fluid guided by the pipe can then reach the recess, e.g. via a clearance inside the tool, in the area of which the fluid can get in contact with a workpiece and thus a corresponding temperature transfer can then take place. Alternatively or in addition, one can also conceive that only recesses and no clearances are provided in the area of the tool where the tool is in contact with a workpiece. The aggregate fluid stream can then take place in the contact area so formed between the tool and the workpiece.

In another preferred embodiment one can conceive that the at least one pipe communicates with a contact area of the tool where the tool, when used, is in contact with a workpiece. Where the pipe is for example formed as clearance inside the structure of the tool, a corresponding orifice between the pipe and the contact area of the tool can be used to let the fluid from the pipe enter into the contact area of the tool or to let it exit therefrom. Herein, the term "use of the tool" is meant to be the use of the tool in order to realise a corresponding press quenching and/or hot stamping and/or tempering method.

In another preferred embodiment one can conceive that the at least one pipe is separated by a wall thickness from a contact area of the tool where the tool, when used, is in contact with a workpiece. A corresponding wall thickness in the corresponding contact areas can prevent the fluid from entering in the contact area and thus from getting into direct contact with the tool and the atmosphere. Thereby, it is possible not to contaminate the workpiece by the fluid during the machining process and thus to simplify continued processing of the workpiece. Furthermore, this allows for avoiding any infection hazards when using flammable fluids as no fluid can be in contact both with a hot workpiece and with the atmosphere respectively with oxygen. It is also provided that the tool features both areas where the pipe communicates with the contact area as well as areas, where the pipe is separated from the contact area by a wall thickness.

In another preferred embodiment, it is furthermore conceivable that the tool comprises at least two pieces couplable with each other, one of which is manufactured by machining by stock removal and the other as an additive. Thereby, the part produced by machining by stock removal can be a seat for the part manufactured as an additive, whereby in aggregate smaller areas must be manufactured as an additive in a time consuming way. It is also possible to be able to use a single fixation piece manufactured by stock removal for different pieces manufactured as an additive, whereby the use of a fixation piece for the workpiece family can be used with workpieces featuring at least partially similar geometries.

In another preferred embodiment it is furthermore conceivable that the tool is manufactured as one single piece and/or that the tool is rotational symmetrical. A manufacture method of the tool as one single piece offers the advantage that the entire tool can be manufactured in one single manufacture process and thus be possibly manufactured in a simpler way. Moreover, the mounting step of the individual tool components which would be necessary for tools manufactured in several pieces is no longer necessary.

In another preferred embodiment, one can furthermore provide for the area manufactured as an additive comprises at least two different materials. Hereby, one can, in a particularly simple way, adjust different thermal conduction properties of the tool depending on the needs respectively achieve the latter ones. Due to such a use of various materials using additive manufacture of the corresponding area, one can in a particularly simple way take into account the various cooling needs of the workpiece.

The invention furthermore relatives to a method for manufacturing a tool according to one of the claims 1 to 8 where a manufacturing step comprises additive machining and an optional manufacturing step of machining the tool by stock removal. The invention furthermore relates to the use of a tool according to one of the claims 1 to 8 for realising a press quenching and tempering method on a workpiece, wherein the workpiece is a rotational symmetric piece, in particular a gear wheel.

Additional details and advantages of the invention are shown in the embodiments illustrated by the figures. Thereby.

Figure 1:
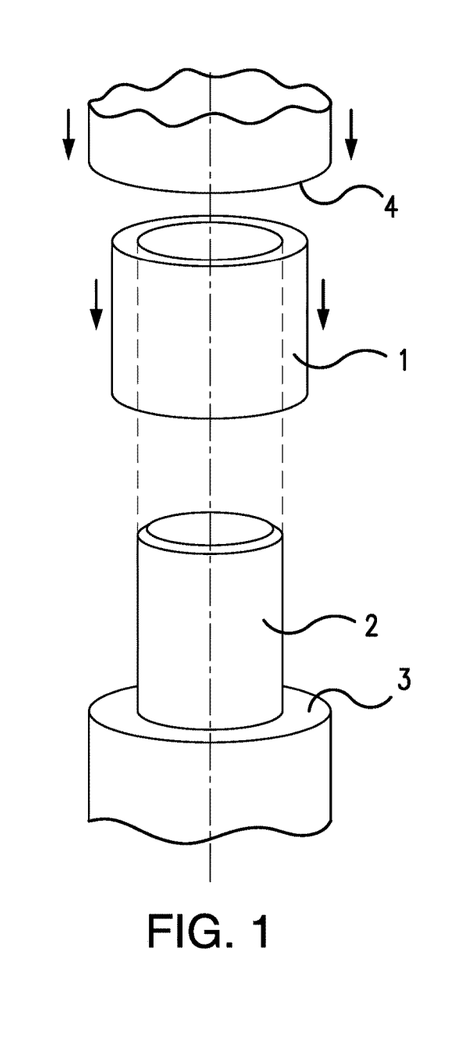
FIG. 1 shows a simplified and not true to scale illustration of a tool of the invention for ring-shaped components.
Figure 2:
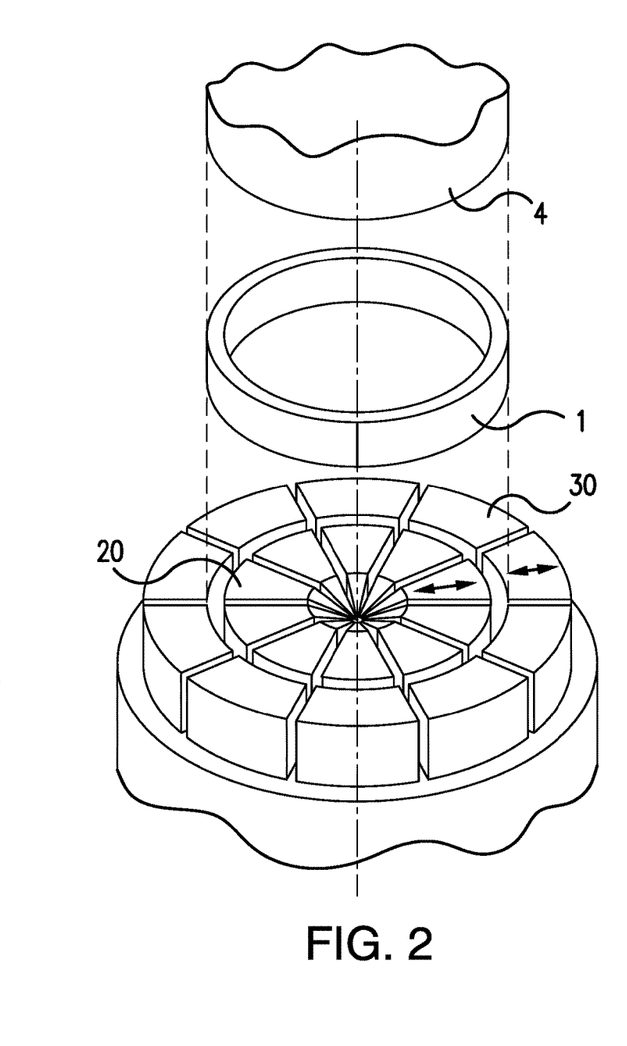
FIG. 2 shows a simplified and not true to scale illustration of a tool of the invention having radially moveable portions for axle symmetrical components.

FIG. 1 is a simplified and not true to scale illustration of a tool of the invention without moveable parts and for cylindrical components respectively workpieces wherein, in said embodiment, the inner cross section of a processed respectively machined workpiece 1 is determined respectively restricted. FIG. 2 shows the essential contact areas between the mounting and a processed respectively machined piece 1. The channels respectively the pipes for infeed and extraction of the cooling fluid are not shown. The reference numerals 2, 3, and 4 refer to surfaces of the mounting respectively to the mounting itself which is in contact with the workpiece 1 when being used, wherein corresponding cooling channels respectively pipes are provided on said surfaces 2, 3, and 4. Owing to the application of additive manufacture methods, one can provide optional respectively random patterns and dimensions of the cooling channels. The reference numeral 4 also refers to a tool respectively a tool piece for applying a vertically oriented force respectively pressure to the machined piece 1.

FIG. 2 shows a simplified and not true to scale illustration of a tool of the invention having moveable segments respectively portions for machining of axle symmetrical components respectively workpieces where a force can impact on respectively on all free surfaces of the machined part 1. The reference numerals 20 and 30 refer to individual moveable segments of the tool. As in FIG. 2, the reference numeral 4 refers to a surface respectively a part of the tool enabling to generate a vertically oriented force respectively corresponding pressure on the machined piece 1.

Figure 3:
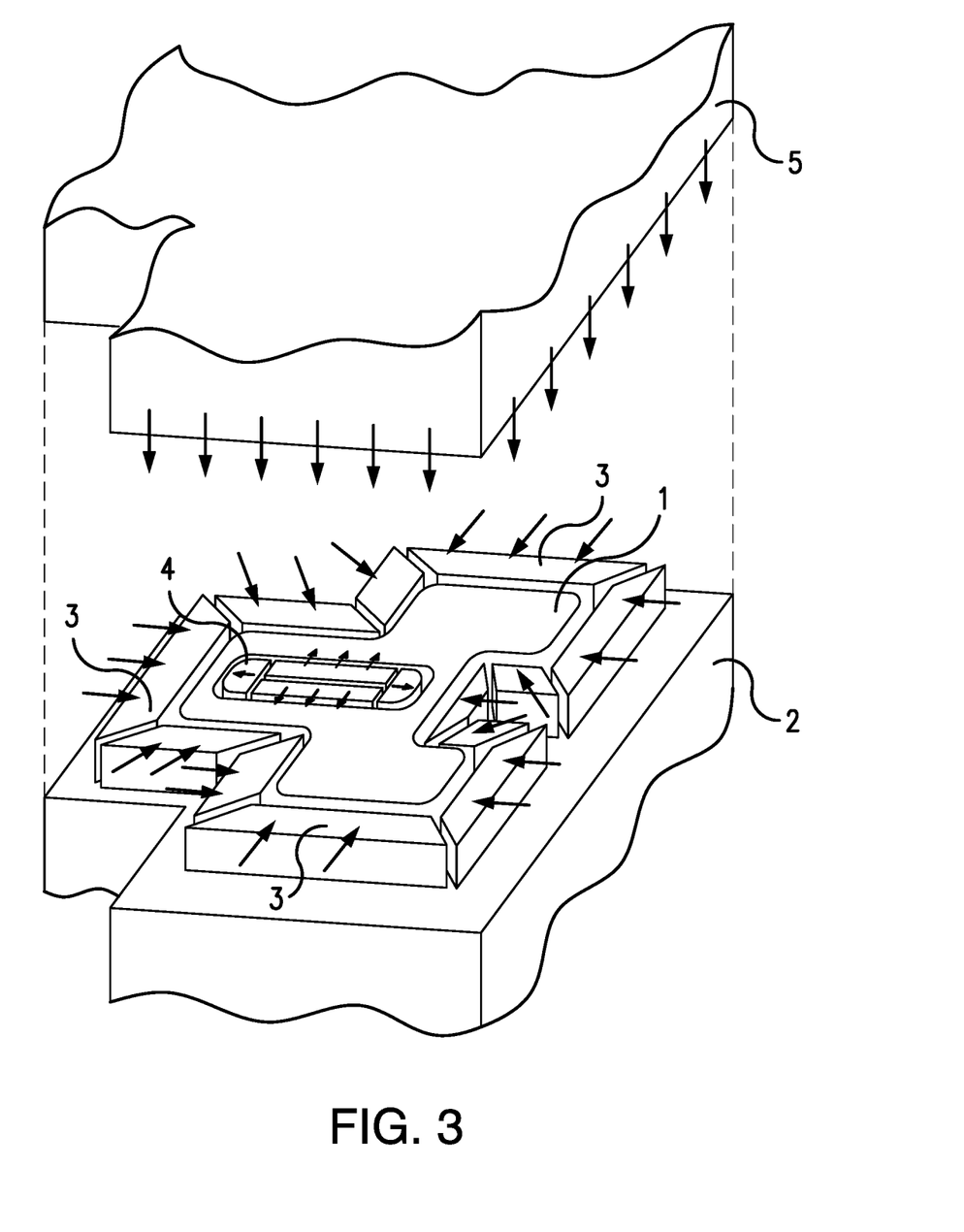
FIG. 3 shows a simplified and not true to scale illustration of a tool of the invention having moveable parts for complex components with a free geometry.

FIG. 3 is a simplified and not true to scale illustration of a tool of the invention having moveable parts for machine of workpieces 1 featuring complex geometries respectively of complex components presenting for example no axle symmetry and/or having free surfaces. Hereby, individual segments of the mounting can be formed by means of the pipe provided by the invention and manufactured as an additive, in order to guide a flow. This implies that the corresponding area of the tool respectively the mounting is an area of the tool manufactured as an additive.

Figure 4:
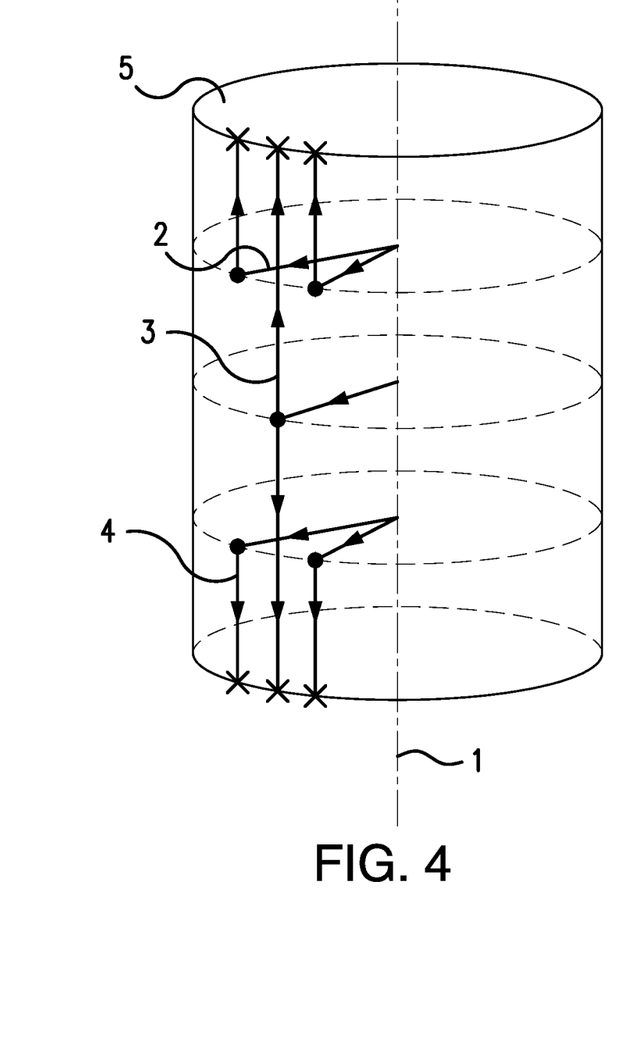
FIG. 4 Shows a schematic and not true to scale illustration of a tool of the invention having cooling fluid inlet channels arranged inside and outlet channels on the mounting surface.
Figure 5:
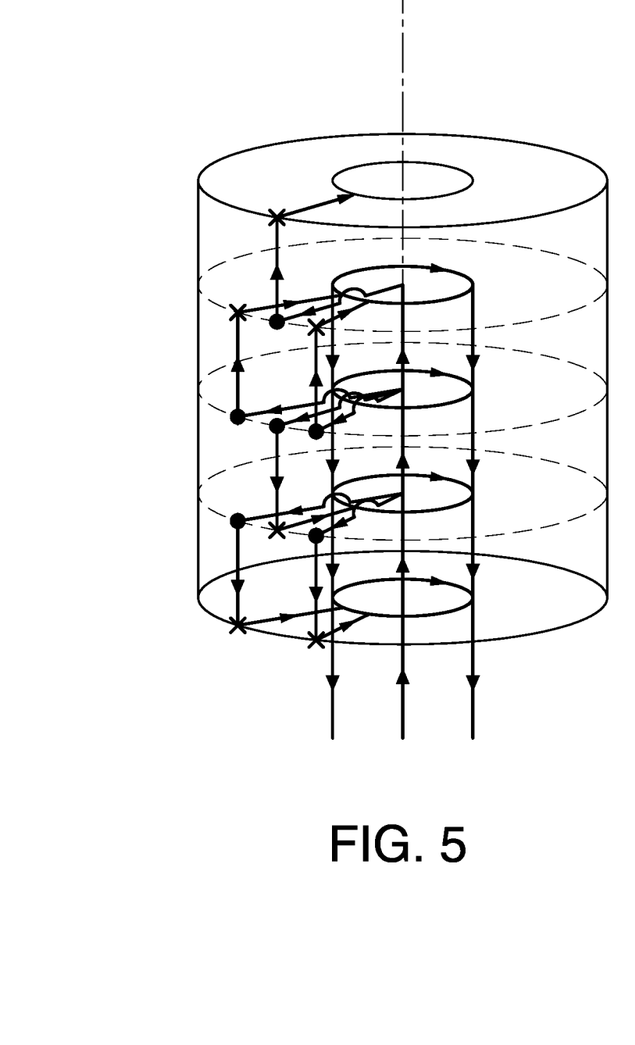
FIG. 5 shows a detailed view of a tool of the invention having cooling fluid inlet and outlet channels provided inside the mounting.

FIGS. 4 and 5 show not true to scale embodiments for the geometrical arrangement respectively configuration of the pipes respectively cooling fluid pipes, in this specific case a cylindrical mounting without moveable segments. For simplification purposes of the illustration of the concept, the pipes respectively the cooling fluid pipes are shown by arrows and lines indicating the flow direction. The areas where the cooling flow respectively the cooling fluid infeed achieves the surface of the workpiece in a first step are marked therein by a dot, whereas the areas where the cooling flow respectively the cooling fluid leaves the surface of the machined workpiece, are marked by an "x" symbol. For the purpose of clarity, the illustration only shows a part of the cooling channels respectively pipes. FIG. 4 is a schematic, not true to scale illustration of a mounting having inner infeed pipes respectively infeed pipes arranged inside and outlet pipes arranged outside respectively on the surface of the workpiece 1. FIG. 5 is a detailed illustration of a tool of the invention having infeed and outlet pipes for the cooling respectively tempering respectively hot stamping fluid which are arranged inside the mounting. This solution enables completely free respectively local configuration respectively arrangement of the flow direction present therein. All flow patterns respectively flow directions shown can be realised to a larger or smaller scale featuring a higher or lower channel respectively pipe thickness than this is shown in the figures, thereby enabling uniformity of thermal transfer to be varied and in particular to be improved or whereby a localised enhanced cooling capacity can be realised, for example in thicker portions of the machined respectively processed workpieces. Hereby, production costs of the mounting are not or increased only to a small extent. Distribution pipes respectively channels arranged inside having different cross sections can be formed in order to locally vary respectively adjust the flow of the cooling fluid. The geometry respectively the design of corresponding channels can furthermore be adapted respectively adjusted such that it leaves sufficient room respectively space for other functional equipment, such as nuts, screws, sensors, valves, or actuators serving for example for connecting the mounting to external supports or other appliances or for moving the mounting respectively of the segments of these where a mounting is flexible.

Figure 6A:
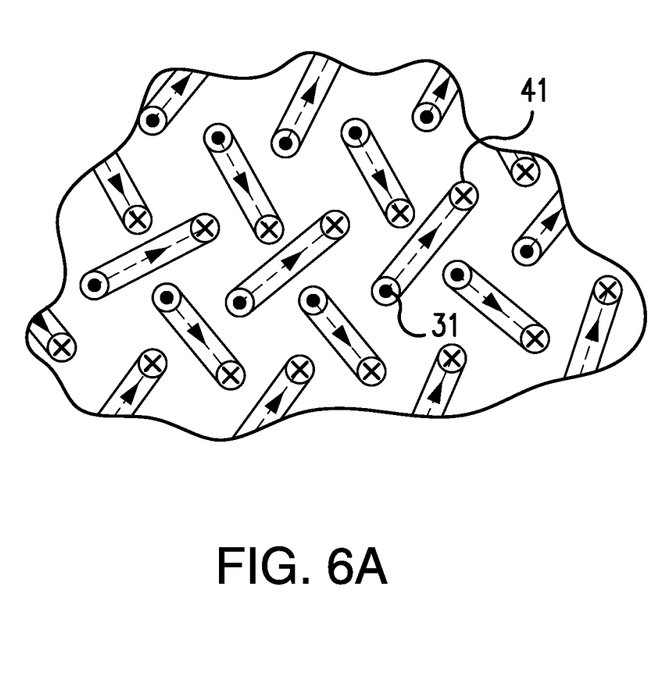
FIGS. 6A, 6B show detailed illustrations of cooling channel patterns and cross sections for generating mixed respectively different flow directions and speed changes alongside the channels.
Figure 6B:
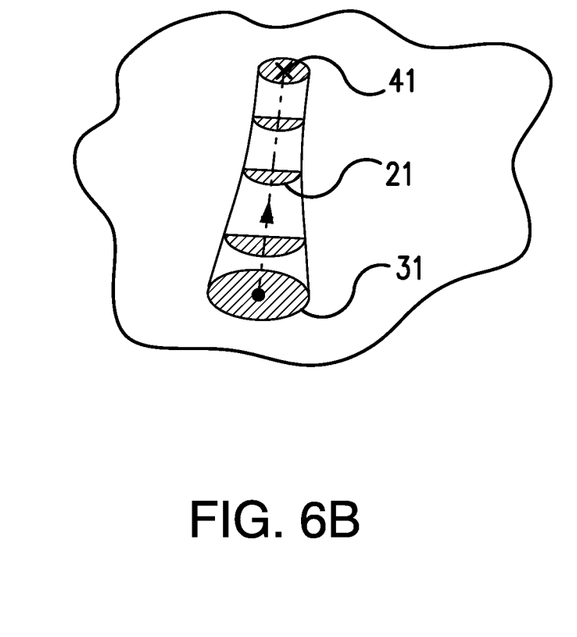

FIGS. 6A and 6B are detailed illustrations of cooling channel patterns and sections respectively portions as those which can be applied to realise a cooling fluid transport on or close to the surface of the mounting for generating mixed flow directions and speed changes inside the channels. FIG. 6A is a detailed illustration of an example of one pattern of pipes illustrating the possibility to orientate the flow in different directions, in particular inside the pipes. FIG. 6B is an illustration of a single cooling pipe respectively one single cooling channel having a varying cross section which is applicable to provide respectively to enable speed changes of the cooling flow alongside the channel respectively alongside the length of the channel. The reference numeral 21 shows optional cross sections of the fluid channel. The reference numeral 31 refers to infeed cross sections, wherein an infeed respectively a flow or inflow of the work fluid is enabled by means of an inside channel and the reference numeral 41 shows an outlet cross section connecting an outside cooling channel to an inside outlet channel of the mounting. The area of different local channel cross sections is arranged to define the speed of the work fluid.

Figure 7A:
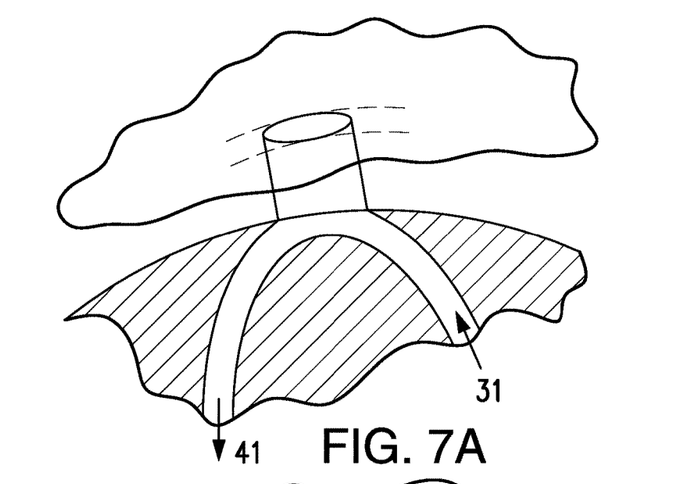
FIGS. 7A-7C show illustrations of channel respectively pipe geometries on the contact surfaces between a workpiece and the tool of the invention.
Figure 7B:
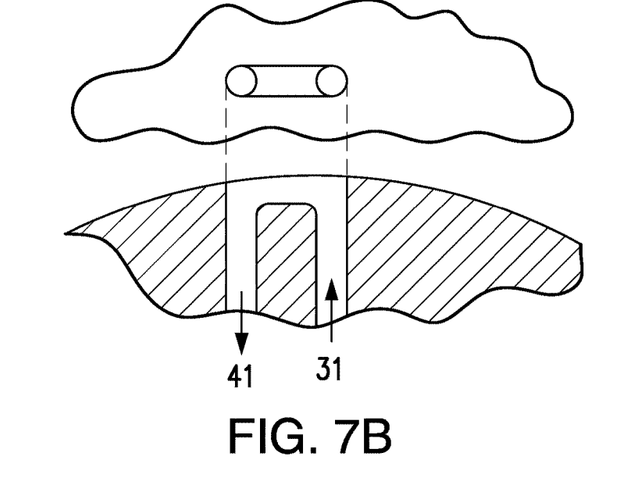
Figure 7C:
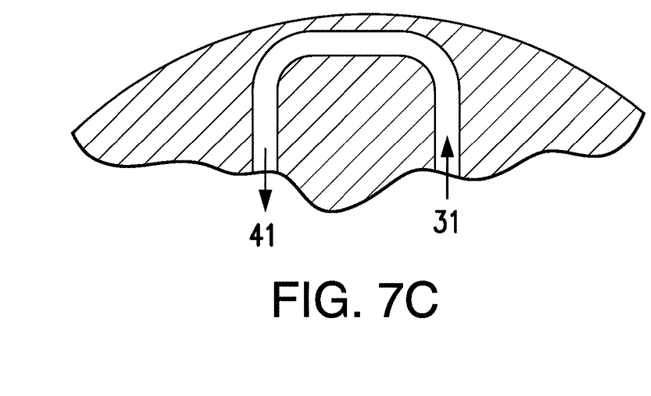

FIGS. 7A-7C show detailed views of the channel respectively pipe geometry in the contact area between the machined respectively processed workpiece and the tool (FIGS. 7A and 7B) of the invention or in proximity of the contact area (FIG. 7C), where the inlet 31 as well as the outlet channels 41 are provided inside the tool of the invention. The intersecting angle between the channel and the workpiece surface can be used for impacting the flow regime respectively the flow behaviour and therefore the thermal transfer. FIG. 7A shows the use of tangential tempering channels as to the sub-surface. FIG. 7B shows the flow channels in orthogonal arrangement with respect to the sub-surface. FIG. 7C furthermore shows a solution where the hot stamping or tempering fluid is not indirectly in contact with the processes respectively machined piece.

Figure 8:
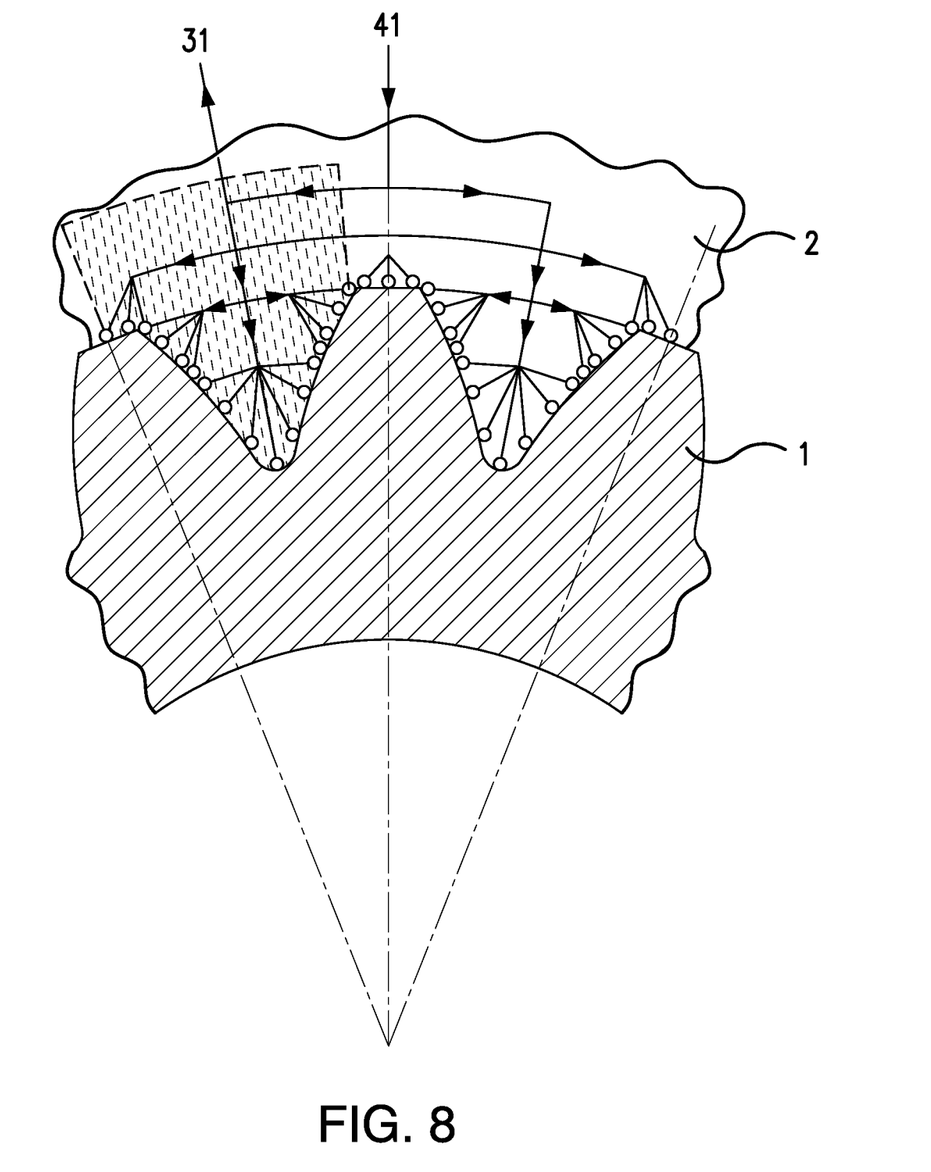
FIG. 8 shows a simplified illustration of a tool of the invention for a geared component as an example of a mounting for a complex geometry.

FIG. 8 is a simplified illustration of a tool of the invention for machining a gear wheel. This figure shows the area of the mounting 2 which is in contact with the gear wheel teeth. Reference numeral 1 refers to the gear wheel 1 to be machined, reference numeral 2 refers to the mounting 2. Reference numeral 31 refers to an outlet for the hot stamping or tempering fluid and reference numeral 41 refers to the corresponding inlets 41 for the hot stamping or tempering fluid. The inlets 41 are shown by a continuous line whereas the outlets 31 are illustrated in one half of the figure only in dotted lines.

The advantages offered by the invention are, among others, a reduction of distortion of the machined workpiece 1 and a reduction of manufacture costs of the mounting 2 respectively the stamps for the parts having complex geometries or for parts manufactured in small numbers of pieces only. The aforesaid advantages are due to the improvements as stated hereinafter for the manufacture of mountings compared to the state of the art:

1. Improved definition of the heat exchange and the mechanical restrictions respectively distortion impediments.

The size of the cooling channels and the contact surface can be reduced significantly while the number of the cooling channels is increased and their geometry is optimised, beyond the limits of usual manufacture processes. It is possible to ensure the same or an enhanced volume flow of the cooling fluid, in particular when compared to a conventional mounting 2. A more dense distribution respectively design of the contact and cooling areas also allows for a more densely distributed respectively designed contact surface, resulting into more uniform, geometrical limitations respectively distortion impediments. Thereby, an improved uniformity or alternatively a localised differentiation of the thermal transfer can be achieved.

2. Choice of the cooling fluid direction and flow optimisation.

By contrast to the stock removing method, an additive manufacture of the mounting 2 enables an optional positioning of inlets and outlets 31, 41 for the cooling fluid, thereby enabling the realisation of multiple respectively different flow directions and optimised flow patterns on individual surfaces or sub-areas of the piece to be machined. This constitutes another parameter for the local control of the heat exchange with the machined piece.

3. Enhanced flexibility with respect to the manufacture of mountings for pieces having complex geometries.

The outside surface of the mounting 2 can be manufactured such that it also reproduces very sub-geometries respectively matches the latter.

4. Combination of different materials in order to enhance mechanical performance By combining different materials to manufacture the mountings 2, it is possible to obtain a harder contact surface between the mounting 2 and the machined pieces 1, as well as enhanced resistance of the core of the mountings 2. This can enhance the performance of the mounting 2.

5. Combination of different materials in order to enhance thermal performance.

The combination of different materials also makes it possible to locally improve the heat exchange respectively the thermal conductivity, for example by using copper in proximity of contact areas and by using steel or titan in the core of the mounting 2.

An appropriate local differentiation depending on the workpiece section to be machined respectively of the machined material cross section of the workpiece 1 is also suitable for improving the thermal extraction depending on the thickness of the machined workpiece 1.

6. Cost savings for pieces manufactured in smaller numbers.

In most cases, a specific tool must be manufactured for each sub-geometry to be manufactured respectively for each sub-geometry to be machined. When manufacturing a portfolio or a group of pieces some of which feature different geometries while having a small number of each geometry only, the use of an adaptive manufacture method offers corresponding cost advantages.

When press quenching, featuring direct contact between the cooling fluid and the piece to be machined, these additional advantages can be achieved.

7. Possibility to increase pressure of the cooling fluid.

By arranging the inlets 31 and the outlets 41 on the same surface or by applying a system featuring closed channels respectively inlets and outlets 31, 41 it will become possible to increase the pressure of the cooling fluid and to modify its thermal-physical behaviour during the machining process.

8. Possibility to avoid direct contact of the workpiece to the cooling fluid.

The use of additive manufacture methods makes it possible to combine very thin walls having geometric characteristics which cannot be achieved by means of manufacture methods by stock removal. For some applications and materials, the cooling channels can be structured in such a way that a thin material layer is maintained, preventing direct contact of the workpiece to the cooling fluid, instead of manufacturing orifices in the mounting surface. Thereby, the cleaning treatment of the workpiece following its machining can be realised with corresponding cost savings. Any contamination of the cooling medium can also be prevented. In addition, press quenching and/or hot stamping and/or tempering methods using oils eliminate infection hazards as no oil is in contact with the hot workpiece and the atmosphere. Finally, no gases or vapours are distributed into the environment, either, as the cooling fluid circulates inside the mounting, thereby generating resulting ecological advantages.

The workpiece of the invention can be used to temper, to heat, to slowly cool a workpiece, to subject it to heat treatment and/or to shape the workpiece. Furthermore, the workpiece can be used in a way such that high pressure flow respectively high pressure fluid is infed into it in order to heat or to cool the workpiece without applying any external forces or pressure onto the machined piece or workpiece. Alternatively or in addition, one can then apply an external force or pressure onto the machined piece and/or the workpiece can be used in a press quenching appliance. The machining respectively work fluid used with the tool can be a gas or a fluid. It is also conceivable that the work fluid is a mixture of substances of various types. The tool can be formed as a single block without any moveable parts or comprise different segments moveable relatively to each other in order to be adjustable to the changes of the workpiece geometry during the machining process respectively to any pieces respectively workpiece geometries of the work pieces to be machined. Furthermore, it can be provided that the workpiece or its components consist of a mixture of components which are manufactured, in part by additive and in part by manufacture methods by stock removal.

Moreover, the contact surface between the tool and the machined workpiece can be manufactured or reworked by a method by stock removal in order to improve the shape accuracy respectively the dimension accuracy of the workpiece and/or one can provide for the workpiece to be coated with a wear-resistant material in order to increase deterioration respectively corrosion or wear resistance of the tool. Moreover, it can be provided that the material of the tool is dimensioned to increase or to decrease local thermal conductivity, wherein the changes of such thermal conductivity are adjusted to the workpiece to be treated.

The workpiece to be machined can be a rotational symmetrical workpiece, such as for example a ring, a gear wheel, a shaft, or a pinion.

Furthermore, the workpiece to be machined can comprise base bodies and surfaces, such as prisms, polygonal prisms, cylinders, and/or spherical surfaces. The workpiece to be machined can also comprise free forms, as this is the case for example with turbine blades, propellers, or ducts.

The tool of the invention makes it possible to restrict respectively to limit the shrinkage or dilatation of the workpiece in a more uniform way, in particular as compared to tools manufactured by methods by stock removal. This is enabled by an increased tool complexity and a precise definition of the flow conditions of the cooling fluid. In order to manufacture the tools of the invention, their geometry is, in a first step, modelized on the basis of the workpiece to be manufactured or the workpiece family to be manufactured. Thereby, the tool is adjusted to the outside surfaces respectively to the outside surface of the workpiece or to common surfaces in a workpiece family.

The tool is manufactured at least in part by means of an additive manufacture method. Other manufacture steps, such as for example manufacture steps by stock removal, coating steps, and other completion steps can be adapted depending on the needs, in particular on the surfaces. This allows in particular for machining of those surfaces which are in contact with the machined workpieces when such workpieces are used.

Generic tools featuring a core manufactured by stock removal and an interface layer which are manufactured by additive method steps or vice versa tools featuring a core manufactured as an additive and an external area manufactured by a method by stock removal respectively an interface layer are all together an object of the invention. In the first case, the core manufactured by stock removal establishes the mechanical and hydraulic connection with the machine tool allotted to the tool, such as a press quenching machine. The main function of the interface layer is to densely distribute the cooling fluid and finally to extract the cooling fluid from the workpiece surface. In the second case, the cooling fluid is infed respectively extracted through the core of the tool and the outside layer manufactured by stock removal and belonging to the workpiece features mainly a structured function and thereby a simplified geometry respectively simplified characteristics.

In both cases, one can separate two different components of the tool before and after operating the machine tool respectively the press. This solution enhances the flexibility of the tool and reduces the volume to be manufactured by the additive manufacture method. The central part respectively core of the tool can be reused for a workpiece family, whereas only the outside portion must be replaced.

The invention claimed is:

1. A tool for realising a press quenching and tempering method for a rotational symmetric workpiece, comprising:
   a mounting comprising an additive manufactured part; and
   at least one cooling channel comprising portions, the at least one cooling channel present within said additive manufactured part, wherein
   the at least one cooling channel is a clearance and/or recess defined by said additive manufactured part,
   each of the portions are a respective contact area or in proximity of the respective contact area of the additive manufactured part and a workpiece surface, the proximity allowing for thermal transfer between the portions and the respective contact areas, the at least one cooling channel is configured such that a first angle of the at least one cooling channel relative to the workpiece surface at a first portion of the portions is different from a second angle of the at least one cooling channel relative to the workpiece surface at a second portion of the portions, and
   the tool further comprising at least two pieces couplable with each other.

2. The tool according to claim 1, wherein one of the at least two pieces couplable with each other is manufactured by machining by stock removal and the other of the at least two pieces couplable is additive manufactured.

3. The tool according to claim 1, wherein the tool is manufactured as a rotational symmetrical one.

4. The tool according to claim 1, wherein the additive manufactured part comprises at least two different materials.

5. The tool according to claim 1, wherein said rotational symmetric workpiece is a gear wheel.

6. The tool according to claim 1, wherein the at least one cooling channel further comprises a cooling channel pattern configured such that flow directions for at least two of the portions of the at least one cooling channel are different from one another.

7. A method for manufacturing the tool according to claim 1, wherein said method comprises additive machining and an optional manufacturing step of machining the tool by stock removal.

8. A method of press quenching and tempering of a workpiece, wherein the workpiece is a rotational symmetric workpiece, and said method comprising utilizing the tool of claim 1 on the workpiece.

9. The method of claim 8, wherein said rotational symmetric workpiece is a gear wheel.

10. A tool for realising a press quenching and tempering method for a rotational symmetric tool, wherein at least a portion of the tool is an additive manufactured part wherein, at least one pipe is formed in the additive manufactured part, the at least one pipe is for guiding a fluid, the at least one pipe comprising pipe portions, wherein each of the pipe portions are a respective workpiece contacting surface of the tool or in proximity of the respective workpiece contacting surface, the proximity allowing for thermal transfer between the pipe portions and the respective workpiece contacting surfaces, the at least one pipe is configured such that a first angle of the at least one pipe relative to the respective workpiece contacting surface at a first pipe portion of the pipe portions is different from a second angle of the at least one pipe relative to the respective workpiece contacting surface at a second pipe portion of the pipe portions.

11. The tool according to claim 10, wherein the tool is manufactured as one piece.

12. A tool for realising a press quenching and tempering method for a rotational symmetric tool, wherein at least a portion of the tool is an additive manufactured part wherein, at least one pipe is formed in the additive manufactured part, the at least one pipe is for guiding a fluid, the at least one pipe comprising pipe portions, wherein each of the pipe portions are a respective workpiece contacting surface of the tool or in proximity of the respective workpiece contacting surface, the proximity allowing for thermal transfer between the pipe portions and the respective workpiece contacting surfaces, the at least one pipe is configured such that a first angle of the at least one pipe relative to the respective workpiece contacting surface at a first pipe portion of the pipe portions is different from a second angle of the at least one pipe relative to the respective workpiece contacting surface at a second pipe portion of the pipe portions, and the tool comprises at least two pieces couplable with each other.

* * * * *